United States Patent Office 3,448,245
Patented June 3, 1969

3,448,245
TEMPERATURE LIMITING CIRCUIT ARRANGEMENT
Harold A. Brouneus, Painted Post, and Lloyd G. Sprague, Bath, N.Y., assignors to Corning Glass Works, Corning, N.Y., a corporation of New York
Filed Sept. 28, 1967, Ser. No. 671,327
Int. Cl. H05b 1/02, 3/00
U.S. Cl. 219—505       8 Claims

ABSTRACT OF THE DISCLOSURE

A circuit arrangement for limiting the temperature of a pair of cooperative electrical resistance heating elements to a preselected maximum temperature, such elements having dissimilar temperature coefficients of resistance and being included in a voltage divider or Wheatstone bridge network which triggers a silicon controlled rectifier to conducting when the temperature of said elements attains or exceeds said maximum temperature. Said triggering of said rectifier modifies time cycles of supply of electrical energy to said heating elements to maintain the average temperature of such elements at or below said preselected maximum temperature.

BACKGROUND OF THE INVENTION

The present invention relates to the field of art of electrical circuit arrangements or circuitry for temperature control of electrical resistance heating elements and heating units incorporating such elements.

One of the most economical electrical circuit arrangements in use today for controlling the temperature of an electrical plate type or so-called surface cooking unit is the "on-off" type wherein a thermally actuated switch, including bimetallic element and associated thermal actuating winding, switches, to either full "on" or full "off," the electrical resistance heating element of the respective cooking unit, there being no means provided for directly detecting the temperature of the cooking unit and regulation of such temperature in accordance with such a detection. Rather, said thermal actuating winding and said bimetallic element of said switch are arranged so that energization of such actuating winding heats the bimetallic element to cause actuation thereof to switch said heating element "off" and to simultaneously de-energize the actuating winding. The cooling of such winding permits the bimetallic element to also cool and switch the heating element "on" to begin another cycle of energization of the winding and actuation of the bimetallic element. Said winding and bitmetallic element are selected with consideration of the characteristics of said heating element so that such cyclic operation of such components heats and maintains the heating element to and at a temperature which will continuously supply a preselected amount of heat to a cooking vessel disposed on the surface type or plate type cooking unit with which the circuit arrangement and its associated components are employed. Some thermally actuated switches of the type described have a manually operated control by which the amount of heat to be supplied to such cooking vessel can be preset or regulated by manually setting or adjusting such control. Such adjustment of the control varies said cyclic operation of the switch.

Circuit arrangements such as that described, while economical, do not, under some conditions, provide for protection of the heating elements or the cooking units with which such elements are employed. For example, it will be assumed that a surface cooking unit having a circuit arrangement such as that described is turned on to provide the maximum amount of heat to a vessel of food or other contents to be disposed on said cooking unit but that, for one reason or another, it occurs that such vessel of food is not so disposed. There is no way provided for the cooking unit to sense the presence or absence of the cooking vessel and, therefore, the heating element of the unit and the unit itself may become overheated because there is no conductive transfer of heat from such unit to the vessel and consequently reduced conductive transfer of heat from the heating element to the cooking unit. Consequently, said heating element may burn out from such overheating. Also many surface cooking units in use today comprise glass or glass-ceramic plates and such plates may also become damaged from such overheating. Consequently, it has heretofore been proposed to use thermistor elements in conjunction with cooking units employing circuit arrangements of the type described, such elements being located in close proximity to the plates or heating elements of such units to detect overheating of the units and/or their heating elements. However, such thermistor elements require associated electronic components, such as signal amplifiers, and the economical advantage of the circuit arrangements described is reduced or destroyed by the addition of said thermistor elements and their associated components. The use of said thermistor elements is, therefore, economically unjustifiable under such conditions. Furthermore, assuming again that a surface cooking unit is turned on to provide the maximum amount of heat to a vessel of food to be disposed on said cooking unit and that such vessel is so disposed but is placed "off-center" of the "burner" area of the unit so that, for example, twenty percent or more of such burner area or plate remains exposed or is not covered by the vessel, sufficient heat may not be conducted away from such exposed area and burn-out of that part of the heating element heating such area or damage to such exposed area of said plate may occur. The use of a thermistor element or elements to detect such overheating is impractical because the regions of a cooking unit at which such devices should be located cannot be determined with any degree of certainty.

In the light of the above discussion it is an object of the present invention to provide an electrical circuit arrangement or circuitry for temperature control of electrical resistance heating elements and heating units embodying such elements, such circuit arrangement or circuitry supplying protection against overheating conditions, such as those previously discussed, and being economical to provide.

SUMMARY OF THE INVENTION

In accomplishing the above object of the invention, there is provided a composite electrical heating element made up of a pair of electrical resistance heating elements having dissimilar temperature coefficients of electrical resistance and having first ends connected with each other to form said composite element. An electrical resistance circuit including a slidewire resistor, a potentiometer or similar device is connected through suitable switching devices across the terminals of a source of alternating current and to the second ends of said pair of elements to provide a voltage divider or Wheatstone bridge circuit. The slide of said resistor or the wiper arm of said potentiometer and said first ends of said heating elements are connected to the control-electrode-cathode circuit of a silicon controlled rectifier having its anode connected to one of said terminals of said current source. When said composite heating element is heated to a selected maximum temperature, said rectifier is triggered or switched to conducting and modifies the electrical energy supplied across said second ends of said pair of heater elements to maintain the temperature of said composite heating element at or below said maximum temperature.

DESCRIPTION OF THE PREFERRED EMBODIMENT

Figure 1:
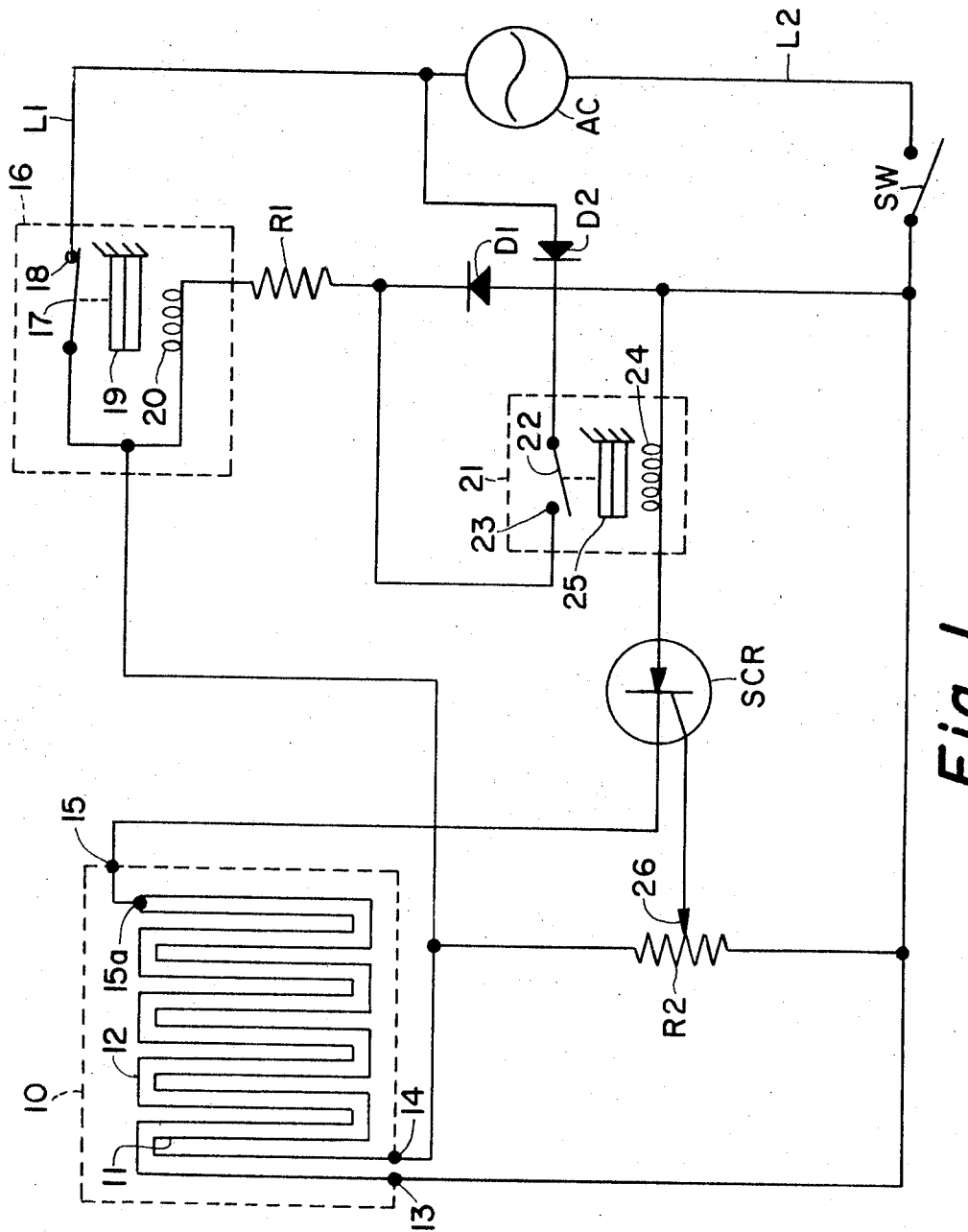
FIGURE 1 is a schematic diagram illustrating the preferred embodiment of the electrical circuit arrangement or form of circuitry embodying the invention, and FIGURE 2 comprises a graph illustrating, in accordance with increases in temperature, changes in the electrical resistance of a pair of heating elements such as those previously mentioned and employed in the invention.

Referring to FIGURE 1 of the drawings there is illustrated in dotted line block form, a burner plate 10 of a plate type or surface type cooking unit which is preferably, but no necessarily, formed of a suitable glass or glass-ceramic material and with which the invention may be advantageously employed. A pair of first and second electrical resistance heating elements 11 and 12, respectively, are shown serpentinely wound parallel with each other and suitably disposed on, in or near plate 10 so as to supply heat thereto when such elements are energized as hereinafter discussed. First ends of said elements are electrically connected to each other to provide a common junction 15a which is, in turn, electrically connected to a suitable terminal 15 on plate 10. The second end of element 11 of said pair of heating elements is electrically connected to a suitable terminal 14 on plate 10 and the second end of element 12 of such pair of heating elements is electrically connected to a suitable terminal 13 on plate 10. It will be understood that, although heating elements 11 and 12 are shown and discussed as serpentinely wound parallel with each other and as advantageously employed in the heating of a burner plate, such as 10, of a surface type cooking unit, it is not intended that the invention be confined to such use but can be employed in conjunction with other type of heating or cooking units.

Heating element 11 is made from a suitable electrical resistance heating alloy material having a relatively low temperature coefficient of electrical resistance, while heating element 12 is made from a suitable electrical resistance heating alloy material having a relatively high temperature coefficient of electrical resistance as compared to the material of element 11. The connecting of electrical resistance heating elements 11 and 12 in series with each other as described may provide, for example, a 1,200 watt composite heating element, although, of course, composite heating elements having other values of wattage can be provided by changing the electrical characteristics of elements 11 and 12.

Figure 2:
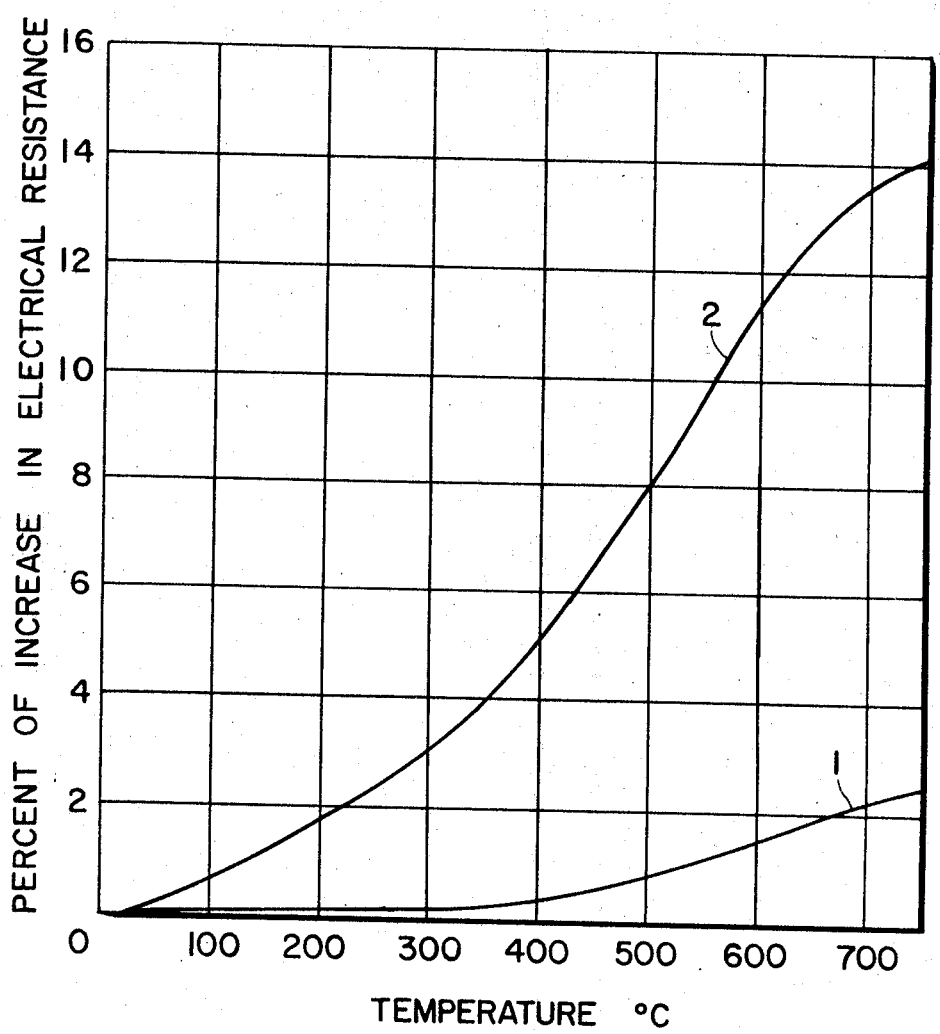

Referring to FIGURE 2 of the drawings, curves 1 and 2 represent the relative percent of increase in electrical resistance of heating elements 11 and 12, respectively, in response to increases in temperature of such elements. It will be noted that elements 11 and 12 have substantially the same electrical resistance at normal ambient temperature when neither element is energized but that the percent of increase in resistance of element 12 is increasingly greater than the percent of increase in resistance of element 11 as the temperature of such elements increases or is increased to approximately 750° C. in response to the heating of such elements as by supplying electrical energy across the ends thereof. This will be further discussed hereinafter in the description of the invention.

Returning to FIGURE 1 of the drawings, there is shown a first thermally actuated switch 16 including a pair of normally closed and preferably snap-acting electrical contacts 17–18, a bimetallic element 19 and a thermal actuating electrical winding 20. When winding 20 is energized from a suitable source of electrical energy, such winding becomes heated and, in turn, heats bimetallic element 19 which, following a preselected period of time, responds to such heating to actuate contacts 17–18, to which the bimetallic element is mechanically connected, to their open condition. When the electrical energy to winding 20 is interrupted, as hereinafter discussed, such winding cools and, in turn, permits element 19 to cool to reactuate contacts 17–18 to their closed condition. Switch 16 may further include a manually actuated means for varying the cycling of contacts 17–18 between open and closed conditions and thereby varying the maximum temperature of heating elements 11 and 12. However, such a cycling or timing adjustment means is not a necessary part of the invention and, therefore, is not shown in the drawings. Switches such as 16 are well known in the art and such switch may, for example, comprise a Robertshaw Model INF electric infinite input control which is manufactured and sold by Indiana Division of Robertshaw Controls Company, whose address is Indiana, Pa., 15701.

A second thermally actuated switch 21 is also employed. Such switch includes a pair of normally open and preferably snap-acting contacts 22–23, a bimetallic element 25 and a thermal actuating winding 24. When winding 24 is energized from a suitable source of electrical energy such winding becomes heated and, in turn, heats bimetallic element 25 which, following a preselected period of time, responds to such heating to actuate contacts 22–23, to which the bimetallic element is mechanically connected, to their closed condition. When the electrical energy to winding 24 is interrupted, as hereinafter discussed, such winding cools and, in turn, permits element 25 to cool to reactuate contacts 22–23 to their open condition. Thus, it is apparent that switch 21 operates in a manner similar to that of switch 16. However, the timing or cycling periods of switches 16 and 21 differ as hereinafter further discussed. Switch 21 may, for example, be a SB–800 Series Thermo-Break Circuit Breaker which is manufactured and sold by Sylvania Electric Products, Inc. and whose address is 730 3rd Ave., New York, N.Y.

There is also shown in FIGURE 1, first and second asymmetric units D1 and D2, a limiting resistor R1, an adjustable resistor R2 which may, for example, be a slidewire resistor or a potentiometer and includes a slide or wiper arm 26, a master control switch SW, a silicon controlled rectifier SCR and a suitable source of alternating current designated AC. Such source may be, but need not necessarily be, a 120 v., 60 c.p.s. source of alternating current, for example.

The components employed in the circuit arrangement or circuitry of the invention having thus been discussed the circuits connecting such components will now be set forth.

Terminal 13 on burner plate 10, and thereby the second end of heating element 12, is connected to one end of the winding of resistor R2 and to one side of master switch SW. The second side of switch SW is connected to a conductor or line L2 which, in turn, connects to one terminal of alternating current source AC. Terminal 14 on burner plate 10 and thereby the second end of heating element 11 is connected to the second end of the winding of resistor R2, and to one end of winding 20 of switch 16 and to contact 17 of such switch. Contact 18 of switch 16 is connected to a conductor or line L1 which, in turn, connects to the other terminal of alternating current source AC. It is apparent, therefore, that heating elements 11 and 12 are energized from current source AC whenever switch SW is closed and contacts 17–18 of switch 16 are in their closed condition.

Terminal 15 of burner plate 10, and thereby junction 15a of the first ends of elements 11 and 12, is connected to the cathode of rectifier SCR, and the control-electrode of such rectifier is connected to slide on wiper arm 26 of resistor or potentiometer R2. Since the winding of resistor R2 is connected across the second ends of heating elements 11 and 12, a voltage divider circuit or Wheatstone bridge including such elements and such resistor is provided. The control-electrode-cathode circuit of rectifier SCR being connected between slide or wiper arm 26 and terminal 15 of plate 10 and thence to junction 15a of elements 11 and 12 as described, such circuit is also connected across opposite junction points of the arms of said Wheatstone bridge or voltage divider circuit. This is believed obvious but will be further discussed hereinafter.

The anode of rectifier SCR is connected to one end of winding 24 of switch 21. The second end of winding 24 of switch 21 is connected to said first side of switch SW and to the low resistance side of asymmetric unit or diode D1. It is thus apparent that winding 24 is energized whenever switch SW is closed, contacts 17–18 of switch 16 are in their closed condition, rectifier SCR is in its conducting condition as hereinafter discussed, and line L2 is positive in relation to line L1.

The second end of winding 20 of switch 16 connects to one end of limiting resistor R1 and the other end of such resistor is connected to the high resistance side of asymmetric unit D1 and to contact 23 of switch 21. Contact 22 of switch 21 connects to the high resistance side of diode or asymmetric unit D2 and the low resistance side of such unit is connected to said other terminal of current source AC, that is, to line L1. Winding 20 of switch 16 is, therefore, energized over a first energizing circuit whenever switch SW is closed, contacts 17–18 of switch 16 are in their closed condition, and line L2 is positive in relation to line L1; or over a second energizing circuit whenever switch SW is closed, contacts 22–23 of switch 21 are in their closed condition, line L1 is positive in relation to line L2, and contacts 17–18 of switch 16 are in their open condition.

The electrical circuit connections of the circuit arrangement or circuitry of the invention having been described, several brief operational examples of the invention will be set forth.

It will be assumed that the components of the invention are in their normal conditions as shown in the drawings and that heating elements 11 and 12 are to be energized so as to be heated to their maximum temperature of, for example, 600° C. for the heating of a vessel of food, or water or other liquid disposed on burner plate 10. It will be further assumed that, for protection of heating elements 11 and 12, and burner plate 10, the temperature of such elements or any part thereof should not exceed about 650° C. Accordingly, slide or wiper arm 26 of resistor or potentiometer R2 is adjusted along the winding of such device, either experimentally or in accordance with known computations, so that rectifier SCR will be switched to conducting, by the previously described voltage divider circuit or Wheatstone bridge, whenever line L2 is positive in relation to line L1 and whenever (referring to FIGURE 2 of the drawings) the percent of increase in electrical resistance of heating element 11 is in excess of the percent of increase in electrical resistance of heating element 12 by approximately 10.5 percent, that is, whenever the temperature of elements 11 and 12 reaches or exceeds about 650° C. (referring further to FIGURE 2).

Under the above assumed conditions, switch SW is now actuated to its closed condition and alternating current from source AC is supplied across said second ends of heating elements 11 and 12 to heat such elements and thereby supply heat to said vessel and its contents. The cycling of switch 16 at such time may, for example, be 10 minutes on and 1 minute off to supply sufficient energy to elements 11 and 12 to maintain such elements at 600° C. and continuously supply maximum heat to said vessel. That is to say, contacts 17–18 of switch 16 may at such time be actuated to their closed condition for 10 minutes, to their open condition for 1 minute and then again to their closed condition for 10 minutes etc. for maintaining elements 11 and 12 at approximately 600° C. At such time winding 20 of switch 16 is energized only when line L2 is positive in relation to line L1 and contacts 17–18 of switch 16 are in their closed condition. This is, of course, the normal operation of the temperature control circuitry when elements 11 and 12 are to provide maximum heat to said vessel. However, it is pointed out that the heat of elements 11 and 12 is continuously being conductively transferred from such elements to plate 10 and thence to said vessel disposed thereon. Accordingly, the characteristics of switch 16 are so selected that when elements 11 and 12 are to be energized so as to be heated to and maintained at or near said 600° C. temperature, such conductive transfer of heat must be compensated for and therefore, energization of the heating elements must be such that they would be heated to a substantially higher temperature than 600° C. if said conductive transfer of heat to the vessel disposed on plate 10 did not occur or was significantly reduced.

Assuming now that, under the above described conditions, said vessel is removed from burner plate 10 without turning switch SW to "off," or that such vessel was not placed on the burner plate as planned, or that a liquid in such vessel was allowed to be boiled entirely away, elements 11 and 12 increase in temperature above 600° C. because, as previously mentioned, insufficient or no conductive transfer of heat to the cooking vessel occurs. When, therefore, the temperature of elements 11 and 12 nears or reaches about 650° C., and line L2 is positive in relation to line L1, and contacts 17–18 of switch 16 are in their closed condition, rectifier SCR is switched to conducting by the previously-discussed voltage divider circuit. At such time energy flows from line L2 through winding 24 of switch 21, through rectifier SCR to terminal 15 of plate 10 and thence through element 11 and contacts 17–18 of switch 16 to line L1. Winding 24 thus becomes heated to actuate contacts 22–23 of switch 21 to their closed condition. The characteristics of switch 21 are so selected that said contacts 22–23 are, for example, actuated to close in approximately 30 seconds following the energization of winding 24 and are actuated to open in approximately 1 minute following sustained de-energization of winding 24.

The actuation of contacts 22–23 to their closed condition as described above, closes the previously-described second energizing circuit for winding 20 of switch 16, and such winding is additionally energized and, thereby, additionally heated to modify the cycling operation of switch 16 and cause actuation of contacts 17–18 to their open condition at earlier points in time in the cycles of operation of said switch than the usual points in time at which such actuation of contacts 17–18 occurs in such cycles of operation of switch 16. Thus, elements 11 and 12 are not energized for as long periods of time as previously and the temperature of said elements is lowered. Such lowering of the temperature of the heating elements will cause rectifier SCR to return to its normal non-conducting condition and thereby return the circuits to normal operation. However upon elements 11 and 12 again becoming overheated, the temperature limiting circuits will again function as just described to prevent damage to such elements or to burner plate 10.

If a vessel, to which maximum heat is being or is to be supplied by the heating of elements 11 and 12, becomes or is placed off-center on burner plate 10 so that a minimum of about 20 percent of the area of the plate above said heating elements is not covered or exposed, the portions of said elements heating said area become overheated and the electrical resistance of such portions will increase sufficiently to also cause operation of the temperature limiting circuitry in the manner previously described and prevent damage to such portions of the heating elements and the part of burner plate 10 heated by such portions. It is pointed out, however, that elements 11 and 12 must be wound parallel with each other throughout their lengths, as illustrated in FIGURE 11, for assured operation of the temperature limiting circuits under such conditions. This is required under such conditions because, if said elements are wound otherwise, a portion of one element may become overheated and no portion of the other element similarly affected. If, for example, a portion of element 11 becomes overheated but no portion of element 12 is similarly affected, the difference in the resistance of said elements is not increased but decreased due to the overheating of element 11 alone. Accordingly, the voltage divider circuit or Wheatstone bridge does not operate to trigger rectifier SCR to conducting and set the temperature limiting circuitry in operation. It is further pointed out, however, that the temperature limiting circuitry will operate to prevent overheating, even if elements 11 and 12 are not wound parallel with each other, if only protection against "no-load" conditions is desired. Such "no-load" conditions must be substantially equally applied to both elements 11 and 12, however. It is believed that this will be readily apparent to those skilled in the art.

Although there is herein shown and described in detail only one circuit arrangement or form of circuitry embodying the invention, it will be understood that various changes and modifications may be made therein within the scope of the appended claims without departing from the spirit and scope of the invention.

What is claimed is:

1. A temperature limiting electrical circuit arrangement comprising:
   (A) a first thermally actuated switch including a pair or normally closed electrical contacts and a thermal actuating winding, said contacts slowly actuated to an open condition in response to heating of said winding by supplying electrical energy thereacross and, relative to said actuation of the contacts to said open condition, rapidly actuated to a closed condition in response to cooling of such winding by interruption of said energy supplied thereacross, a first of said contacts electrically connected to a first terminal of a source of alternating current;
   (B) a pair of electrical resistance heating elements having dissimilar temperature coefficients of electrical resistance, first ends of such elements electrically connected with each other, the second end of a first of such pair of elements electrically connected to the second of said electrical contacts of said switch and to a first end of said winding thereof, and the second end of the second of such pair of elements electrically connected to the second terminal of said alternating current source;
   (C) an electrical circuit including a first asymmetric unit electrically connecting said second terminal of said alternating current source to the second end of said winding of said switch with the low resistance direction through such unit being from said second terminal to such winding;
   (D) a second thermally actuated switch including a pair of normally open electrical contacts and a thermal actuating winding, said contacts rapidly actuated to a closed condition in response to heating of said winding by supplying electrical energy thereacross and, relative to said actuation of the contacts to said closed condition, slowly actuated to an open condition in response to cooling of such winding by interruption of said energy supplied thereacross, a first of said contacts of such second switch electrically connected to said second end of said winding of said first switch;
   (E) an electrical circuit including a second asymmetric unit electrically connecting said first terminal of said alternating current source to the second of said contacts of said second switch with the low resistance direction through such unit being from such first terminal to such second contact;
   (F) an electrical resistance circuit connected across said second ends of said pair of heating elements to provide a voltage divider network including such pair of heating elements and said circuit, such circuit comprising a resistor including an electrical junction adjustable along the resistor winding intermediate the ends thereof;
   (G) a silicon controlled rectifier having its anode electrically connected to a first end of said winding of said second switch, and its control-electrode-cathode circuit electrically connected between said first ends of said pair of elements and said electrical junction of said resistor, such electrical junction adjusted so as to switch said rectifier to conducting when, in response to the temperature of said pair of elements exceeding a predetermined maximum value, the electrical resistance of one of said pair of elements exceeds that of the other of such pair by a predetermined value due to said dissimilar temperature coefficients of resistance of such elements; and
   (H) an electrical circuit connecting the second end of said winding of said second switch to the respective terminal of said alternating current source which, whenever said rectifier is switched to conducting, is positive in relation to the other respective terminal of said current source.

2. A circuit arrangement in accordance with claim 1 and in which said first and second heating elements have, relative to each other, low and high temperature coefficients of resistance, respectively.

3. A circuit arrangement in accordance with claim 1 and in which said first and second heating elements of said pair of such elements have, relative to each other, low and high temperature coefficients of electrical resistance, respectively, said terminal of said alternating current source to which said second end of said winding of said second switch is electrically connected is said second terminal of such source, and the control electrode and cathode of said rectifier are electrically connected to said electrical junction and to said first ends of said pair of elements, respectively.

4. A circuit arrangement in accordance with claim 1 and in which the percent of increase of electrical resistance of said first heating element in response to increases in temperature thereof is substantially less than the percent of increase of electrical resistance of said second heating element in response to similar temperature increases in such second element.

5. A circuit arrangement in accordance with claim 1 and in which said resistor comprises a potentiometer and said adjustable junction comprises the wiper arm of such potentiometer.

6. Temperature limiting electrical circuitry comprising:
   (A) a first thermally actuated switch including a pair of normally closed electrical contacts and a thermal actuating winding, said contacts actuated to an open condition in response to heating of said winding by supplying electrical energy thereacross and actuated to a closed condition in response to cooling of such winding by sustained interruption of said energy supplied there across, a first of said contacts electrically connected to a first terminal of a source of alternating current;
   (B) first and second electrical resistance heating elements serpentinely wound parallel with each other on an electrical heating unit, first ends of said elements electrically connected with each other, the second end of said first element electrically connected to the second of said electrical contacts of said switch and to a first end of said winding thereof, and the second end of said second element electrically connected to the second terminal of said alternating current source, said first element having a temperature coefficient of electrical resistance lower than such temperature coefficient of said second element;
   (C) an electrical circuit including a first asymmetric unit electrically connecting said second terminal of said alternating current source to the second end of said winding of said switch with the low resistance current flow path through such unit being from said second terminal toward such winding;

(D) a second thermally actuated switch including a pair of normally open electrical contacts and a thermal actuating winding, said contacts actuated to a closed condition in response to heating of said winding by supplying electrical energy thereacross and actuated to an open condition in response to cooling of such winding by sustained interruption of said enregy supplied thereacross, a first of said contacts of such second switch electrically connected to said second end of said winding of said first switch, and a first end of said winding of said second switch electrically connected to said second terminal of said alternating current source;

(E) an electrical circuit including a second asymmetric unit electrically connecting said first terminal of said alternating current source to the second of said contacts of said second switch with the low resistance current flow path through such unit being from said first terminal toward such second contact;

(F) a silicon controlled rectifier having its cathode electrically connected to said first ends of said first and second heating elements and its anode electrically connected to the second end of said winding of said second switch; and (G) a resistor electrically connected across said second ends of said pair of heating elements to provide a Wheatstone bridge circuit including such pair of elements and said resistor, such resistor including an electrical junction adjustable along the resistor winding intermediate the ends thereof and electrically connected to the control-electrode of said rectifier, such junction being adjusted along said resistor winding so as to cause said rectifier to switch to conducting when the difference in the resistance of said heating elements exceeds a value representative of a selected maximum temperature for such elements.

7. Electrical circuitry in accordance with claim 6 and in which the percent of increase in electrical resistance of said first heating element in response to temperature increases thereof is substantially less than the percent of increase in electrical resistance of said second heating element in response to temperature increases in such second element corresponding to those of said first element.

8. Electrical circuitry in accordance with claim 6 and in which said resistor comprises a potentiometer and said adjustable junction comprises the wiper arm of such potentiometer.

References Cited

FOREIGN PATENTS 1,221,883  6/1960  France.

BERNARD A. GILHEANY, *Primary Examiner.*

F. E. BELL, *Assistant Examiner.*

U.S. Cl. X.R.

219—481, 494